(12) United States Patent
Takai et al.

(10) Patent No.: US 6,753,085 B2
(45) Date of Patent: Jun. 22, 2004

(54) HEAT-RESISTANT COATED MEMBER

(75) Inventors: Yasushi Takai, Takefu (JP); Noriaki Hamaya, Takefu (JP); Masami Kaneyoshi, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/173,030

(22) Filed: Jun. 18, 2002

(65) Prior Publication Data

US 2003/0017350 A1 Jan. 23, 2003

(30) Foreign Application Priority Data

Jun. 18, 2001 (JP) ........................................ 2001-183510
Nov. 20, 2001 (JP) ........................................ 2001-354673

(51) Int. Cl.⁷ ................................................ B32B 9/00
(52) U.S. Cl. ........................ 428/408; 428/332; 428/699; 428/701; 428/702; 428/698
(58) Field of Search ................................ 428/632, 633, 428/469, 408, 698, 699, 701, 702, 332, 220

(56) References Cited

U.S. PATENT DOCUMENTS

| | | | |
|---|---|---|---|
| 4,502,983 A | * | 3/1985 | Omori et al. |
| 5,514,482 A | * | 5/1996 | Strangman |
| 5,560,993 A | * | 10/1996 | Morimoto et al. |
| 5,662,737 A | | 9/1997 | Chen |
| 5,993,970 A | | 11/1999 | Oscarsson et al. |
| 6,387,526 B1 | * | 5/2002 | Beele |
| 6,440,575 B1 | * | 8/2002 | Heimberg et al. |
| 2002/0177014 A1 | | 11/2002 | Kaneyoshi et al. |

FOREIGN PATENT DOCUMENTS

| | | |
|---|---|---|
| EP | 1 167 565 A3 | 1/2002 |
| EP | 1 167 565 A2 | 1/2002 |
| EP | 1 239 055 A2 | 9/2002 |
| EP | 1 243 666 A1 | 9/2002 |
| JP | 2000-509102 A | 7/2000 |
| WO | WO97/4023 A1 | 10/1997 |

* cited by examiner

Primary Examiner—Jennifer McNeil
(74) Attorney, Agent, or Firm—Birch, Stewart, Kolasch & Birch, LLP

(57) ABSTRACT

A heat-resistant coated member comprises a substrate composed of a material selected from among molybdenum, tantalum, tungsten, zirconium, aluminum, titanium, carbon, and alloys, oxide ceramics, non-oxide ceramics and carbide materials thereof, which is covered with a layer composed primarily of a rare earth-containing oxide. In addition to heat resistance, the coated member has good corrosion resistance and non-reactivity, making it highly suitable as a part for sintering or heat-treating metals and ceramics in a vacuum, an inert atmosphere or a reducing atmosphere.

6 Claims, No Drawings

HEAT-RESISTANT COATED MEMBER

BACKGROUND OF THE INVENTION

1. Field of the Invention

The present invention relates to a heat-resistant coated member for use when sintering or heat-treating metals or ceramics in a vacuum, an inert atmosphere or a reducing atmosphere.

2. Prior Art

Powder metallurgy products are generally manufactured by mixing a binder phase-forming powder with the primary alloy, then kneading the mixture, followed by pressing, sintering and post-sintering treatment. The sintering step is carried out in a vacuum or an inert gas atmosphere, and at an elevated temperature of 1,000 to 1,600° C.

In a typical cemented carbide manufacturing process, a solid solution of tungsten carbide with cobalt or of titanium carbide or tantalum carbide is comminuted and mixed, then subjected to drying and granulation to produce a granulated powder. The powder is then pressed, following which such steps as dewaxing, pre-sintering, sintering and machining are carried out to give the final cemented carbide product.

Sintering is carried out at a temperature at or above the temperature at which the cemented carbide liquid phase appears. For example, the eutectic temperature for a ternary WC-Co system is 1,298° C. The sintering temperature is generally within a range of 1,350 to 1,550° C. In the sintering step, it is important to control the atmosphere so as to enable cemented carbide correctly containing the target amount of carbon to be stably sintered.

When cemented carbide is sintered at about 1,500° C., green specimens placed on a carbon tray often react with the tray. That is, a process known as cementation occurs, in which carbon from the tray impregnates the specimen, lowering the strength of the specimen. A number of attempts have been made to avoid this type of problem, either by choosing another type of tray material or by providing on the surface of the tray a barrier layer composed of a material that does not react with the green specimen. For example, ceramic powders such as zirconia, alumina and yttrium oxide are commonly used when sintering a cemented carbide material. One way of doing so is to scatter the ceramic powder over the tray and use it as a placing powder. Another way is to mix the ceramic powder with a solvent and spray-coat the mixture onto the tray or apply it thereto as a highly viscous slurry. Yet another way is to form a coat by using a thermal spraying or other suitable process to deposit a dense ceramic film onto the tray. These techniques are described in JP-A 2000-509102. Providing such an oxide layer as a barrier layer on the surface of the tray has sometimes helped to prevent reaction of the tray with the specimen.

However, reaction with the tray arises even with the formation of such a barrier layer. As a result, after use in one or two sintering operations, the barrier layer on the tray cracks and delaminates.

Delamination of the film allows the carbon tray to react more easily with the specimen. Moreover, given the risk that the film will delaminate, fragment into small pieces, and become incorporated into the green specimen during sintering, a new tray must be used each time sintering is carried out.

A need has thus been felt, particularly in regards to the use of such trays in sintering, for a way to prevent the specimen from reacting with the barrier layer and the barrier layer from reacting with the tray and delaminating. There exists in particular a desire for a tray material which has a long service life and which, regardless of how many times the tray is used in the sintering of powder metallurgy products, does not result in reaction of the specimen with the barrier layer or in separation of the barrier layer from the tray substrate.

SUMMARY OF THE INVENTION

It is therefore an object of the invention to provide a heat-resistant, corrosion-resistant, highly non-reactive, and inexpensive coated member for use when sintering or heat-treating metals or ceramics in a vacuum, an inert atmosphere or a reducing atmosphere.

We have discovered that heat-resistant coated members made of a substrate composed of a specific type of material and a layer which covers the substrate and is composed primarily of a rare earth-containing oxide have excellent heat resistance, corrosion resistance and non-reactivity when used in the sintering or heat treatment of metals or ceramics in a vacuum, an inert atmosphere or a reducing atmosphere.

Accordingly, the invention provides a heat-resistant coated member in which a substrate composed of a material selected from among molybdenum, tantalum, tungsten, zirconium, aluminum, titanium, carbon, and alloys, oxide ceramics, non-oxide ceramics and carbide materials thereof is coated with a layer composed primarily of a rare earth-containing oxide.

It is advantageous for the rare earth-containing oxide to be composed primarily of at least one element selected from among dysprosium, holmium, erbium, terbium, gadolinium, thulium, ytterbium, lutetium, europium and samarium, and preferably at least one element selected from among ytterbium, europium and samarium.

The layer composed primarily of a rare earth-containing oxide preferably includes ytterbium in an amount which accounts for at least 80 atom % of all the metal elements, including rare-earth elements, in the layer. Moreover, it is advantageous for the layer composed primarily of a rare earth-containing oxide to have a thickness of 0.02 to 0.4 mm and to be provided thereon with one or more layer of a compound of at least one element selected from among Group 3A to Group 8 elements in the short-form periodic table.

The substrate in the heat-resistant coated member of the invention is preferably made of carbon having a density of at least 1.5 g/cm$^3$.

The heat-resistant coated member of the invention is typically used for sintering metals or ceramics in a vacuum, an inert atmosphere or a reducing atmosphere.

DETAILED DESCRIPTION OF THE INVENTION

As noted above, the heat-resistant coated member of the invention is intended for use particularly when sintering or heat-treating, in a vacuum, inert atmosphere or reducing atmosphere, the metal or ceramic from which a product is to be formed. The type of coating oxide, the type of substrate and the combination thereof must be varied and optimized in accordance with the product itself and the temperature and type of gas used in sintering and heat treatment.

The heat-resistant coated member of the invention is particularly effective as crucibles for melting metal or as parts for fabricating and sintering various types of complex oxides. Examples of such parts include setters, saggers, trays and molds.

In the invention, the substrate for forming such heat-resistant, corrosion-resistant members used in the sintering or heat treatment of metals and ceramics is selected from among molybdenum, tantalum, tungsten, zirconium, aluminum, titanium, carbon, and also alloys, oxide ceramics, non-oxide ceramics and carbide materials thereof.

When carbon is used as the substrate, the carbon substrate has a density of preferably at least 1.5 g/cm$^3$, and especially 1.6 to 1.9 g/cm$^3$. Carbon has a true density of 2.26 g/cm$^3$. At a substrate density of less than 1.5 g/cm$^3$, although the low density provides the substrate with good resistance to thermal shock, the porosity is high, which makes the substrate more likely to adsorb atmospheric moisture and carbon dioxide and sometimes results in the release of adsorbed moisture and carbon dioxide in a vacuum. Moreover, to enhance formation of the film on the substrate, it is preferable for the oxide layer to have a thermal expansion coefficient of not more than 4×10$^6$ to 7×10$^6$.

When a transparent ceramic such as YAG is sintered, treatment within a temperature range of 1,500 to 1,800° C. in a vacuum, an inert atmosphere or a weakly reducing atmosphere tends to give rise to reactions between the substrate material and the film oxide and to reactions between the film oxide and the product on account of the elevated temperature. It is therefore important to select a substrate and film oxide combination that discourages such reactions from arising. At temperatures above 1,500° C. in particular, when carbon is used in the substrate, aluminum and rare-earth elements tend to form carbides in a vacuum or a reducing atmosphere. Under such conditions, it is desirable to use molybdenum, tantalum and tungsten as the substrate and to use a film-forming jig in which a rare-earth-containing oxide has been combined with the film oxide.

The heat-resistant coated member of the invention is made up of the above-described substrate and, coated thereon, a layer composed primarily of a rare earth-containing oxide as the film oxide.

The rare-earth containing oxide used in the invention is preferably an oxide containing a lanthanoid element; that is, an element selected from among those having the atomic numbers 57 to 71. Of these, the light rare-earth elements lanthanum, cerium, praseodymium and neodymium undergo transitions in their crystalline structures at around 1,500° C. Hence, for high-temperature applications, it is preferable to carry out coating with an oxide containing one or more rare-earth elements selected from among dysprosium, holmium, erbium, terbium, thulium, ytterbium, gadolinium, lutetium, europium and samarium. The use of an oxide containing one or more from among ytterbium, samarium and europium is especially preferred. An oxide that contains ytterbium in an amount that accounts for at least 80 atom % of all the metal elements, including rare-earth elements in the layer, is particularly desirable for good adhesion between the film and the substrate.

Aside from rare earth-containing oxides, oxides of metals selected from Group 3A to Group 8 elements (excluding the above-rare-earth elements) in the short form periodic table may be included within the layer composed primarily of a rare earth-containing oxide in an amount of 0 to 20 wt %, and especially up to 10 wt %, based on single oxides of these other metals. Oxides of one or more metal selected from among aluminum, silicon, zinc, iron, titanium, manganese, vanadium and yttrium are preferred. These metals other than rare-earth elements may be formed into complex oxides with rare-earth elements. Alternatively, single oxides of these metals may be formed, then mixed with rare earth-containing oxides or the foregoing complex oxides.

The oxide used is preferably composed of oxide particles having an average size of 10 to 70 μm. The coated substrate of the invention is typically produced by plasma spraying or flame spraying the oxide onto the above-described substrate in an inert atmosphere such as argon. If necessary, the surface of the substrate may be prepared by a suitable technique such as blasting prior to such a thermal spraying operation.

The layer composed primarily of a rare earth-containing oxide which is coated onto the substrate may consist of only a single layer or may in fact consist of two or more layers. The total thickness of the layer or layers is preferably 0.02 to 0.4 mm, and most preferably 0.1 to 0.2 mm. At less than 0.02 mm, there is a possibility that the substrate and the material being sintered may react with repeated use of the coated member. On the other hand, at more than 0.4 mm, thermal shock within the coated oxide film may cause the oxide to delaminate, possibly resulting in contamination of the product.

In the present invention, the above-described coat composed primarily of a rare earth-containing oxide may have provided thereon one or more layer of a compound of at least one element selected from among Group 3A to Group 8 elements in the short-form periodic table. Exemplary compounds of this type include oxides and nitrides. A layer of a compound composed of a lanthanoid element, scandium, yttrium or another element such as aluminum, titanium, zirconium or manganese is preferred. Compounds of rare-earth elements other than yttrium are preferably compounds other than oxides, and are most preferably nitrides.

It is desirable for such a layer or layers, referred to hereinafter as the "outer coat," to be applied to a collective thickness of 0.01 to 0.1 mm.

In the practice of the invention, the coating layer on the coated member (i.e., either the layer composed primarily of a rare earth-containing oxide or the outer coat if an outer coat has been formed thereon) is formed to a surface roughness Ra of at least 2 μm and, if necessary, subjected to surface preparation by a suitable technique such as polishing. A surface roughness of 2 to 30 μm, and especially 3 to 10 μm, is preferred for imparting good sinterability to the sintered body being fabricated. At a surface roughness of less than 2 μm, the coating layer is so flat that this may interfere with sintering shrinkage by the workpiece resting thereon.

The member produced in the foregoing manner may be used to effectively heat-treat or sinter the above-described metals and ceramics at a temperature of up to 1,800° C., and preferably 900 to 1,700° C., for 1 to 50 hours. The heat treatment or sintering atmosphere is preferably a vacuum or an inert or reducing atmosphere, so long as the oxygen partial pressure is not more than 0.01 MPa.

The coated member of the invention can be advantageously used as, for example, a part in the production of any metal or ceramic that may be obtained by sintering or heat treatment. Exemplary metals and ceramics include chromium alloys, molybdenum alloys, tungsten carbide, silicon carbide, silicon nitride, titanium boride, rare-earth-aluminum complex oxides, rare earth-transition metal alloys, titanium alloys, rare earth-containing oxides, and rare earth complex oxides. Use in the production of tungsten carbide, rare earth-containing oxides, rare earth-aluminum complex oxides, and rare earth-transition metal alloys is especially advantageous. More specifically, coated members according to the invention, such as parts, are particularly effective in the production of transparent ceramics such as YAG and cemented carbides such as tungsten carbide, the production of Sm—Co alloys, Nd—Fe—B alloys and Sm—Fe—N alloys used in sintered magnets, and the production of Tb—Dy—Fe alloys used in sintered magnetostrictive materials and Er—Ni alloys used in sintered regenerators.

Examples of suitable inert atmospheres include argon or nitrogen atmospheres. Examples of suitable reducing atmospheres include inert gas atmospheres in which a carbon heater is used, and inert gas atmospheres containing also several percent of hydrogen gas. An oxygen partial pressure of not more than 0.01 MPa ensures that the coated members are kept resistant to corrosion.

In addition to having a good heat resistance, the coated member of the invention also has a good corrosion resistance and non-reactivity, and can therefore be effectively used for sintering or heat-treating metals or ceramics in a vacuum, an inert atmosphere or a reducing atmosphere.

EXAMPLES

The following examples, comparative examples and reference example are provided to illustrate the invention, and are not intended to limit the scope thereof.

Examples 1 to 14, and Comparative Examples 1 and 2

Molybdenum, tantalum and carbon substrates having dimensions of 50×50×5 mm were furnished for the respective examples. The surface of the substrate was roughened by blasting, following which rare earth-containing oxide particles having the compositions and average particle sizes indicated in Table 1 were plasma-sprayed onto the surface in argon/hydrogen, thereby coating the substrate with a layer of rare earth-containing oxide to form a coated member.

The physical properties of the coated members were measured. The results are shown in Table 1. The compositions were measured using inductively coupled plasma spectroscopy (Seiko SPS-4000), and the average particle sizes were measured by a laser diffraction method (Nikkiso FRA).

The physical properties of the plasma-sprayed films were also measured. Those results are given below in Table 2. The thickness of the plasma-sprayed film was determined from a cross-sectional image of the film taken with an optical microscope. The surface roughness Ra was measured with a surface roughness gauge (SE3500K; Kosaka Laboratory, Ltd.).

The coated member obtained in each example was placed in a carbon heater furnace, following which the temperature was ramped up to a given temperature at a rate of 500° C./h, held at that temperature for a given length of time, then lowered at a rate of 400° C./h. This heating and cooling cycle was carried out twice, after which the appearance of the coated member was examined. The results are given in Table 2.

TABLE 1

|  | Composition (weight ratio) | Average particle size ($\mu$m) | Substrate material | Substrate density (g/cm$^3$) |
| --- | --- | --- | --- | --- |
| Example 1 | $Er_2O_3$ | 60 | Mo | 10 |
| Example 2 | $Er_2O_3$ | 50 | Ta | 16 |
| Example 3 | $Er_2O_3$ | 40 | C | 1.7 |
| Example 4 | $Yb_2O_3$ | 60 | Mo | 10 |
| Example 5 | $Yb_2O_3$ | 50 | Ta | 16 |
| Example 6 | $Yb_2O_3$ | 40 | C | 1.7 |
| Example 7 | $Er_2O_3:Yb_2O_3 = 50:50$ | 30 | Mo | 10 |
| Example 8 | $Er_2O_3:Yb_2O_3 = 50:50$ | 30 | Ta | 16 |
| Example 9 | $Er_2O_3:Yb_2O_3 = 50:50$ | 25 | C | 1.7 |
| Example 10 | $Er_2O_3:Al_2O_3 = 88:12$ | 60 | Mo | 10 |
| Example 11 | $Er_2O_3:Al_2O_3 = 88:12$ | 60 | Ta | 16 |
| Example 12 | $Er_2O_3:Al_2O_3 = 88:12$ | 60 | C | 1.7 |
| Example 13 | $Yb_2O_3 + Er_2O_3$ | $Yb_2O_3 = 40$ $Er_2O_3 = 40$ | C | 1.7 |
| Example 14 | $Yb_2O_3 + Y_2O_3$ | $Yb_2O_3 = 40$ $Y_2O_3 = 60$ | C | 1.7 |
| Comparative Example 1 | — | — | Mo | 10 |
| Comparative Example 2 | $Y_2O_3$ | 60 | C | 1.7 |

TABLE 2

|  | Sprayed film thickness (mm) | Surface roughness Ra ($\mu$m) | Atmosphere | $O_2$ partial pressure (MPa) | Temp. (° C.) | Holding time (h) | Appearance | Separation of substrate and coat |
| --- | --- | --- | --- | --- | --- | --- | --- | --- |
| Example 1 | 0.20 | 10 | vacuum | 0.001 | 1250 | 4 | no change | no |
| Example 2 | 0.15 | 8 | Ar | 0.001 | 1250 | 4 | no change | no |
| Example 3 | 0.20 | 6 | $N_2 + H_2$ | 0.001 | 1250 | 4 | no change | no |
| Example 4 | 0.20 | 10 | vacuum | 0.0001 | 1600 | 4 | no change | no |
| Example 5 | 0.15 | 8 | Ar | 0.0001 | 1600 | 4 | no change | no |
| Example 6 | 0.20 | 6 | $N_2 + H_2$ | 0.0001 | 1600 | 4 | no change | no |
| Example 7 | 0.15 | 5 | vacuum | 0.01 | 1800 | 4 | no change | no |
| Example 8 | 0.15 | 5 | Ar | 0.01 | 1800 | 4 | no change | no |
| Example 9 | 0.15 | 4 | $N_2 + H_2$ | 0.01 | 1800 | 4 | no change | no |
| Example 10 | 0.15 | 11 | vacuum | 0.0001 | 1250 | 4 | no change | no |
| Example 11 | 0.15 | 10 | Ar | 0.0001 | 1250 | 4 | no change | no |
| Example 12 | 0.15 | 12 | $N_2 + H_2$ | 0.0001 | 1250 | 4 | no change | no |
| Example 13 | 0.20 | 6 | $N_2 + H_2$ | 0.0001 | 1600 | 4 | no change | no |
| Example 14 | 0.20 | 10 | $N_2 + H_2$ | 0.0001 | 1600 | 4 | no change | no |
| Comparative Example 1 | — | 10 | vacuum | 0.001 | 1250 | 4 | deformation | — |
| Comparative Example 2 | 0.35 | 10 | $N_2 + H_2$ | 0.001 | 1600 | 4 | cracks | yes |

The parts produced in Examples 1 to 14 according to the invention showed no change after heat treatment in a carbon heater furnace relative to before treatment. By contrast, following heat treatment in a carbon heater furnace, the parts produced in Comparative Examples 1 and 2 underwent surface cracking or oxide delamination, leading to corrosion.

Reference Example

First, 0.84 g of carbon powder having a specific surface area of 200 m$^2$/g and 0.01 mole of rare earth-containing oxide powders (average particle size, 1 to 2 μm) composed of the respective starting materials shown in Table 3 were thoroughly ground and mixed together with a small amount of ethanol in a mortar, then dried in a vacuum desiccator, giving mixed powders. Each of the mixed powders was pressed in a mold, forming 20 mm diameter pellets. The pellets were fired in an argon atmosphere at 1,420° C. for 2 hours, after which the fired pellets were quickly crushed into a coarse powder and 1.5 g of the respective specimens were collected in stopperable specimen bottles. Next, 0.1 cm$^3$ of deionized water was added to each bottle, and the bottles were stoppered. The stoppered bottles were left at rest for a while until the contents reached equilibrium, following which the gases within each bottles was subjected to gas chromatographic analysis to determine the amount of acetylene therein. The results are shown in Table 3 below.

TABLE 3

| | Amount of acetylene generated (mm$^3$) |
|---|---|
| $Y_2O_3$ | 1.94 |
| $Er_2O_3$ | 1.07 |
| $Yb_2O_3$ | 0.06 |

The oxides of rare-earth elements having a relatively high atomic number such as erbium and ytterbium exhibit a lower level of acetylene formation than the metal oxides of rare-earth elements having a relatively low atomic number such as yttrium. In other words, little hydrolyzable carbide forms. What this means is that, when a carbon substrate is covered with a rare earth-containing oxide layer, carbide is less likely to form at the interface in the course of the heating/cooling/atmospheric release cycle, thus making it less likely that the bonding strength of the film to the substrate will be diminished by carbide hydrolysis. One reason for the difference in behavior between rare-earth elements is the ion radius. Carbide formation, carbide hydrolysis, or both are thought to be less likely to occur at a smaller ionic radius.

Moreover, acetylene generation is believed to be particularly low in the case of $Yb_2O_3$ because, in addition to its small ionic radius, ytterbium, unlike most rare-earth elements, assumes an oxidation number 2 state with relative ease. To establish whether this is indeed the case, a coated member fabricated in the same way as in Example 6 was high-frequency induction heated in a high vacuum until a temperature of at least 1,500° C. was observed with a optical pyrometer. A trace amount of YbO was found to be present in the desorbed gases.

Example 13

As in Example 6, a carbon substrate was prepared, then plasma-sprayed with $Yb_2O_3$ particles having an average size of 40 μm in argon/hydrogen to form a 0.1 mm coat. $Er_2O_3$ particles having an average size of 40 μm were subsequently plasma sprayed within the same atmosphere to form a 0.2 mm coated member.

Example 14

Aside from using $Y_2O_3$ having an average particle size of 60 μm instead of $Er_2O_3$, the same procedure was carried out as in Example 13, giving a 0.2 mm coated member.

Japanese Patent Application No. 2001-354673 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A heat-resistant coated member comprising a substrate coated with a layer composed substantially of a lanthanoid-containing oxide wherein the substrate is made of carbon having a density of at least 1.5 g/cm$^3$ and up to 1.9 g/cm$^3$.

2. The heat-resistant coated member of claim 1, wherein the lanthanoid-contianing oxide consists essentially of at least one element selected from the group consisting of dysprosium, holmium, erbium, terbium, gadolinium, thulium, ytterbium, lutetium, europium,and samarium,.

3. The heat-resistant coated member of claim 2, wherein the lanthanoid-containing oxide consists essentially of at least one element selected from among ytterbium, europium and samarium.

4.The heat-resistant coated member of claim 1, wherein the layer of the lanthanoid-containing is a lanthanoid-containing oxide layer containing ytterbium in an amount that accounts for at least 80 atom % of all the metal elements including lanthanoid elements.

5. The heat-resistant coated member of claim 1, wherein the layer of lanthanoid-containing oxide has a thickness of from 0.02 to 0.4 mm.

6. The heat-resistant coated member of claim 1, wherein the layer of lanthanoid-containing oxide is provided thereon with one or more layers of a compound of at least one element selected from among Group IIIA to Group VIII elements in the CAS version of the periodic table.

* * * * *